June 6, 1961  O. PETERS  2,987,064
APPARATUS FOR TREATING PARTICULATE MATERIALS
Filed Dec. 18, 1958
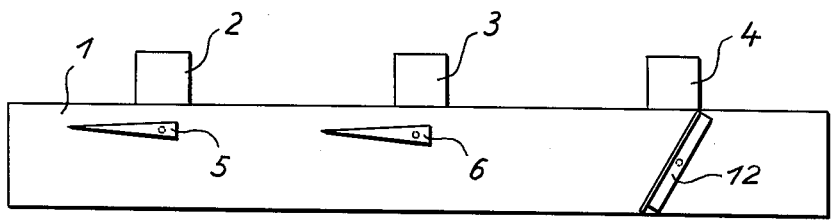
Fig.1
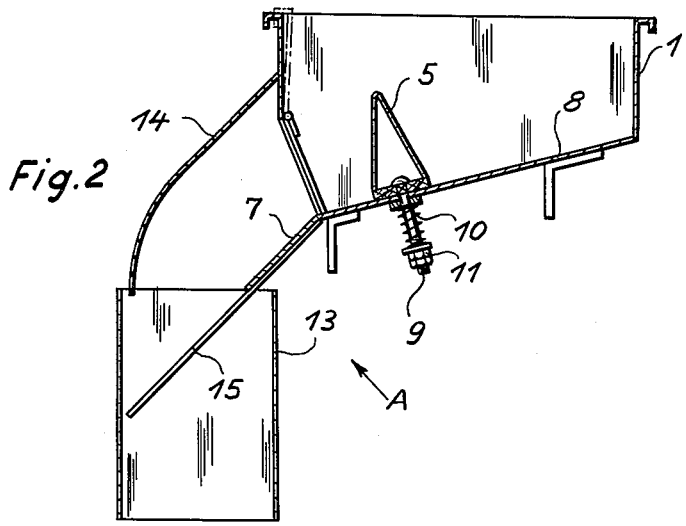
Fig.2
Fig.3
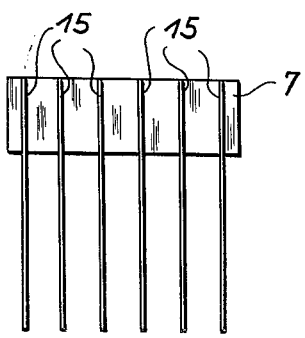
Fig.4
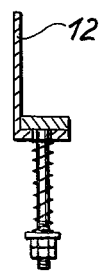
INVENTOR:
Otto Peters,
BY Singer, Stern & Carlberg
Attorneys.

2,987,064
APPARATUS FOR TREATING PARTICULATE MATERIALS
Otto Peters, Hamburg-Lohbrugge, Germany, assignor to Hauni-Werke Korber & Co., K.G., Hamburg-Bergedorf, Germany
Filed Dec. 18, 1958, Ser. No. 781,317
Claims priority, application Germany Feb. 1, 1958
3 Claims. (Cl. 131—149)

The present invention relates to apparatus for treating particulate materials and particularly for loosening and distributing foliate, fibrous or other material, for example tobacco, supplied to or fed by a ductway.

For the uniform supplying of handling machines for tobacco and other particulate material, especially tobacco cutters, distributor means arranged in the ductways or feeder shafts are known which loosen the material supplied by an endless conveyor and simultaneously distribute it in layer form in the ducts or shafts. Most of these devices require their own individual drive. In one constructional form the distributor means are arranged in yieldable manner in the duct in such manner that they execute a vibratory movement under the action of the material falling on them without having themselves to be driven. This very simple device has proved perfectly satisfactory but is limited by the necessity of taking into account the natural swing or throw of the material as regards its action and its operational effectiveness.

The present invention relates to a loosening and distributing device in which the material is supplied to the duct or shaft from a vibratory feeder channel by means of a delivery chute. The invention utilizes what may be regarded as this available vibratory movement for operating the distributor means and consists in the fact that the end of the vibratory conveyor projecting into the duct or shaft is constructed as a screen occupying a substantial proportion of its cross-section.

Thereby with the minimum additional equipment a substantial distribution and loosening of the material is secured.

It is already known to employ vibratory screens for loosening tobacco. Further it is known to provide a shaker device constructed as a cross shaker in a vibratory channel feeder and in the form of a screen arranged above the bottom of the channel feeder, on which the material supplied from a delivery point falls before it reaches the bottom of the channel. The invention is not however concerned merely with the loosening or opening of materials pure and simple but with the arrangement of the vibratory distributor above the duct or shaft whereby a uniform layering of the material in the duct is obtained.

The inclination of the screen can be varied and fixed after adjustment in order that it can be disposed for the most favourable operating conditions. In the simplest form a material is used for the screen rods which is adapted to flex so that the assembly can be effected by bending the individual rods of these devices.

One constructional example of the invention is shown diagrammatically on the accompanying drawing wherein:

FIG. 1 is a plan of a vibratory feeder with three delivery points for adjacent handling machines.

FIG. 2 is a side view of the vibratory conveyor in the region of a delivery point with the associated delivery duct or shaft.

FIG. 3 is a plan of the vibratory screen in the direction of the arrow A of FIG. 2, and FIG. 4 shows the construction of the guide blade for the final delivery point.

The tobacco, for example, coming from an opening or loosening plant enters the vibratory channel feeder 1 which includes, for example, three delivery points 2, 3 and 4. In the region of the delivery points 2 and 3 wedge-shaped guide blades 5 and 6 are provided which deflect the required amounts of tobacco through side-wall openings in the feeder 1 in the direction towards the chute 7 (FIG. 2) in each case. Since the chutes 7 are fixed to the vibratory channel feeder 1 they participate in the vibratory movement thereof.

The wedge-shaped guide blades 5 and 6 are adjustably secured to the bottom 8 of the vibratory feeder as shown in FIG. 2 as applied to the wedge plate 5. A pin 9 which passes through the base plate of the guide blade 5 and a hole in the bottom wall 8 carries a spring 10 on the side of the bottom wall 8 opposite to the guide blade 5, which is tightened by means of nuts 11 to such an extent that undesired displacement of the guide blade 5 is impossible although adjustment thereof can be effected. In the region of the final delivery point 4 an adjustable guide blade 12 is provided which as shown in FIG. 4 is adjustableable in like manner to the wedge-shaped guide blades 5 and 6, but in this case it extends obliquely across the channel. The adjustment of the guide blades 5, 6 and 12 is such that the desired parts or the residual part of the tobacco stream is fed in regular manner to the delivery points 2, 3 and 4.

As shown in FIG. 2 feeder ducts or shafts 13 of further handling machines are arranged beneath the delivery points 2, 3 and 4, for example for feeding a tobacco cutter. Rods 15 are fastened to the chute 7 (see also FIG. 3) according to the invention in such manner that they project to the desired extent and at the desired angle into the duct or shaft 13. This angle can be varied according to requirements for which reason the chute may be pivotally arranged and adapted to be fixed in adjusted position. In general the adjustment is however effected merely by bending the individual rods forming the screen. A cover 14 secured to the channel feeder 1 and which projects into the duct or shaft hinders outward distribution of the tobacco. By making the screen rods 15 bendable but sufficiently rigid to substantially retain their shape under working conditions of the apparatus it becomes readily possible to adjust them in accordance with any particular conditions which are encountered and furthermore they may be readily installed and removed from position merely by selective adjustment or flexure of the rods.

What I claim is:

1. Apparatus for loosening and disentangling particulate material, such as tobacco, by vibratory action, comprising elongated longitudinally vibratory means for moving said material, stationary discharge ducts open at the top and disposed at intervals beside said vibratory means, lateral discharge chutes secured to said vibratory means and each inclined towards the open top of one of said discharge ducts, and means defining a grating secured to each of said discharge chutes and extending into the respective discharge duct.

2. Apparatus as set forth in claim 1, in which said means defining a grating comprises a plurality of rods extending laterally of the vibratory means, said rods being bendable but sufficiently rigid to substantially retain their shape under working conditions of the apparatus.

3. Apparatus as set forth in claim 1, including deflector means secured to said vibratory means adjacent to each of said discharge chutes, and means for adjusting the position of said deflector means relative to said vibratory means.

References Cited in the file of this patent
UNITED STATES PATENTS

| | | |
|---|---|---|
| 1,535,075 | Knap | Apr. 21, 1925 |
| 2,642,980 | Soucek | June 23, 1953 |
| 2,873,747 | Schlossmacher | Feb. 17, 1959 |